Patented Aug. 6, 1935

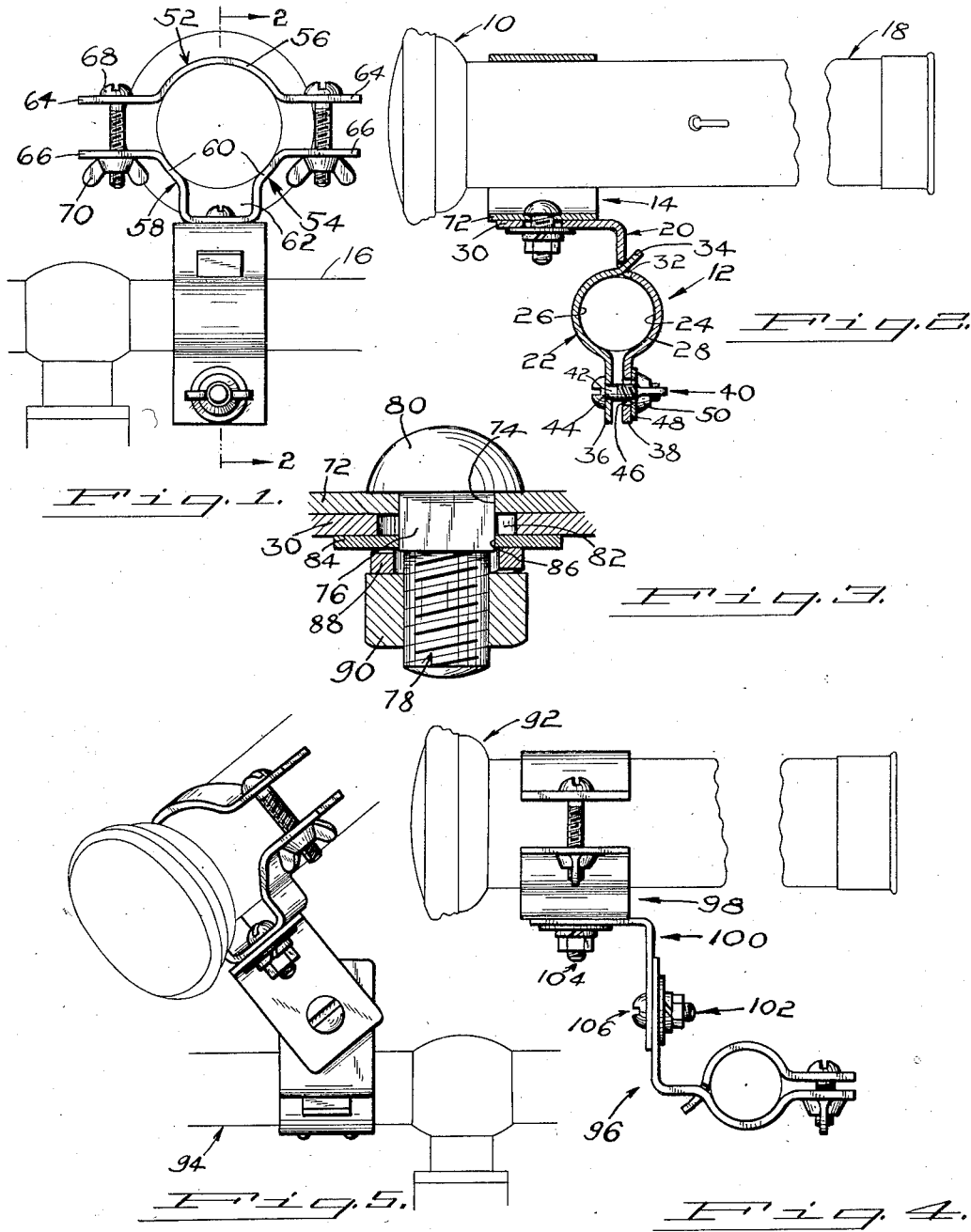

2,010,058

UNITED STATES PATENT OFFICE 2,010,058

LAMP SUPPORT FOR BICYCLES

Oscar A. Carlson, West Lawn, Pa., assignor to
D. P. Harris Manufacturing Co., Reading Pa.

Application June 7, 1932, Serial No. 615,829

3 Claims. (Cl. 240—58)

This invention relates to lamp supports for bicycles.

It is an object of the invention to provide means whereby a lamp may be securely mounted in position on some suitable part of a bicycle, such as the handle bar, and yet will thereafter be permitted ready swivelling into any desired angular relationship to the direction of movement of the bicycle. The lamp may then be arranged to illuminate the road or any other part of the path along which such vehicle is moving.

For this purpose, it is an object of the invention to provide a swivel joint of such character that, while it may readily be broken down into its several elements so that it may, with facility, be transported, yet, when assembled, the frictional contact of the parts upon relative rotational movement will not affect the locking of the securing elements.

In one embodiment, a bolt, which retains associated the members moving with relation to each other and forms a pivot for them, is formed with an unthreaded section of non-circular cross-section which, in assembly, is seated within a similarly formed opening in one of the members. This section is of sufficient length to extend through both members, although the opening in the other member is not such as to effect an interlock between that member and the bolt, permitting relative rotation of that member and the bolt. Received over the extending end of the bolt is a washer having an opening such as to prevent relative rotational movement of it and the non-circular section of the bolt. Over this washer is received preferably a spring washer and some fastening means, such as a nut, for resiliently clamping the parts together. Sliding friction which occurs as the members rotate relatively will not be transmitted to the nut, which, thus protected, will not tend to unthread.

The support for the lamp consists of one or more members so interlinked by the described pivoting arrangement that the lamp may be adjusted into any desired relationship. One of the members is formed so that, together with a complementary element, it may encircle the handle bar to which the apparatus is secured. Where the apparatus is intended for association with any one of a number of bars of substantially the same diameter, an opening may be provided in the member with which will then cooperate a finger on the complementary element to retain these parts in fixedly located relation to the bar.

Other objects of this invention will hereinafter be set forth, or will be apparent from the description and the drawing, in which are illustrated embodiments of apparatus for carrying out the invention.

On the drawing, in which the same reference characters refer to the same parts throughout, and in which are disclosed preferred embodiments:

Fig. 1 is a rear elevational view of the handle bar of a bicycle, illustrating the arrangement thereon of a support embodying the invention, the bar being broken away;

Fig. 2 is a sectional view on the line 2—2 of Fig. 1;

Fig. 3 is an enlarged portion of Fig. 2, illustrating the construction of the swivel connection;

Fig. 4 is a side elevational view of a modified form of the invention, the elements thereof being positioned in normal relationship; and Fig. 5 is a front elevational view, illustrating the apparatus of Fig. 4 positioned in an adjusted relationship.

For use as a lamp 10 for a bicycle, there has been herein illustrated a flash-light of customary construction. It is to be understood, however, that the invention may be applied for retaining in position on a bicycle or the like other devices of substantially the same character. By means of a retainer 12 and a bracket 14, constructed and associated as hereinafter described, the lamp is anchored with relation to the handle bar 16 of a bicycle but is still capable of adjustment, while so positioned, into any desired angular relation to the direction of movement of the bicycle. The user may, by grasping the end 18 of the lamp while so mounted and while the bicycle is moving, force the lamp to move over a desired path and thus, while he is so moving, locate for himself objects other than those in the path of his movement, using the lamp for the purposes of a spot light as well as a vehicle light.

Retainer 12 may consist of an L-shaped member 20 and a complementary member 22. Handlebars of bicycles generally are of standard diameter and vary but slightly. Members 20 and 22, to be associated with bar 16 are, therefore, each formed with similar, oppositely curving depressions 24 and 26, preferably conforming substantially to the curvature of bar 16. Depression 24 is in the arm 28 of member 20, and is spaced away from the free end of that arm. Immediately at the boundary of the depression in the body of the member adjacent the other arm 30 is preferably provided a slot or opening 32. Member 22 has a finger 34 extending from the wall of the depression 26, which finger may be entered into the slot, when the depressions are located around a bar. The cooperation of slot and finger thus locates the depressions properly with relation to bar 16.

Members 20 and 22, thus positioned, provide extending ends 36 and 38 with which may cooperate a device 40 to drive the depressions tightly against the bar. The device may consist of a bolt 42, extending through openings 44 and 46 in the respective ends 36 and 38, and a washer 48 and a nut 50, received over the end of the bolt extending beyond the end 38.

Bracket 14 preferably consists of a pair of stampings 52 and 54. Stamping 52 may be formed with an arcuate shaped portion 56, designed to conform generally with the curvature of lamps intended to be carried on the bicycle. Stamping 54 likewise has an indented intermediate portion 58, which may include the curved portions 60 and a deep well 62. The extending ends 64 and 66 of the stampings may be locked together by suitable means, such as bolts 68 and nuts 70. These bolts provide for tightly clamping the lamp with relation to its holder.

The bottom of well 62 preferably is flattened to provide a platform 72 in which a square or otherwise non-circular opening 74 is formed. Seated within this opening is the unthreaded, squared or otherwise non-circular section 76 of a bolt 78. The section is located preferably in conjunction with the head 80 which seats against the platform 72, the section substantially conforming in cross-section with the shaping of the opening to lock the bolt against rotational movement relative to the platform.

The bolt extends through the opening and through an opening 82 in arm 30, the latter opening being large enough and properly shaped to accommodate section 76 without affecting the relative rotation of these parts. Preferably section 76 is of sufficient length to extend beyond platform 72 and arm 30 and for the reception over the extending end of the bolt of a washer 84. The washer has an opening 86 therein of a shaping such that it will cooperate with section 76 to be locked against rotation with relation to the bolt. Upon this washer may then be seated a split spring washer 88, over which a nut 90 may be positioned.

The swivel provided by bolt 78, washers 84 and 88 and nut 90 is such that the lamp may readily be rotated to position it in any desired angular relation, and even though platform 72 is forced firmly into contact with arm 30 by the coaction of nut 90, resilient washer 88 and washer 84, still the tightness of the adjustment of nut 90 upon bolt 78 will not be affected. The bolt, platform 72 and washer 84 are all locked to rotate together. When these parts are rotated relatively to arm 30, there is no frictional force acting at any point upon the nut which would tend to loosen or tighten the nut.

In the modification of Figs. 4 and 5, the arrangement is such that lamp 92 not only may be rotated in a horizontal plane, but also in a vertical plane; the lamp, therefore, is capable practically of any angular relationship to handle bar 94. The means for clamping arm 96 to bar 94, in this case, may be substantially the same as that described for the structure of Figs. 1, 2 and 3. In like manner, the mounting of bracket 98 upon L-shaped member 100 preferably is substantially of the same character as the mounting of socket 14 upon arm 30.

In this case, however, arm 96 is secured to L-shaped member 100 by a means 102 similar in structure to the assembly of bolt 78, washers 84 and 88 and nut 90, whereby member 100 and arm 96 may be rotated relatively without affecting, in any way, the efficiency of the securing means. With the two pivots provided at points 104 and 106, it can be seen that lamp 92 may be positioned for adjustment into substantially any angular relation to bar 94.

While I have shown and described the preferred embodiments of my invention, it will be understood that certain changes in the construction and arrangement of parts may be made. Therefore, I do not wish to be limited to the precise constructions shown, except as may be required by the appended claims considered in connection with the prior art.

What I claim as new and useful is—

1. A lamp-supporting device for mounting upon a bicycle handle bar, a pair of L-shaped members, one leg of one of the members having means for clampingly engaging the bar, a bracket for reception of a lamp, both legs of the other member having pivoting means provided thereon, the bracket being associated with one of the pivoting means and the other arm of the first member being associated with the other pivoting means, whereby the lamp may be adjusted to point in any direction, each of the pivoting means consisting of a bolt extending through the pivotally associated elements and locked against rotation with relation to one of them, means for forcing the bolt and the elements resiliently into association, and means between the bolt and the other element for taking up the transmitted pressure, said means being held against rotation with relation to the bolt.

2. A lamp-supporting device for mounting upon a bicycle handle bar, the device including a pair of right-angularly bent sheet metal strips, a leg of each of the strips being in face-to-face contacting relationship, the other legs being disposed to extend in opposite directions and removed from each other, one of these oppositely directed legs being bent to receive the handle bar, means cooperating with the bent handle-bar-receiving leg clampingly to engage the bar, and a bracket for a lamp, the bracket having a body portion resting against the other of the oppositely directed legs, means pivotally connecting said body portion and said last mentioned leg, and means pivotally connecting the legs disposed in face-to-face relation, the legs disposed in face-to-face relation being free to pivot with relation to each other so that the faces slide one over the other.

3. A lamp-supporting device for mounting upon a bicycle handle bar, the device including a length of flat metal bent to form an upstanding member having a platform extending therefrom, a bracket for a lamp, the bracket including a strap provided with a substantially flat seat, the seat being disposed to rest upon the platform, an element extending through seat and platform and locked against rotation relative to one of them, means cooperating with the element to retain platform and seat resiliently in face-to-face contact without interfering with relative rotation thereof, a right angular member having a leg bent to receive the handle-bar and a leg pivotally connected to said upstanding member in face-to-face relation therewith, and means cooperating with the bent handle-bar receiving leg clampingly to engage the bar.

OSCAR A. CARLSON.